(12) United States Patent
Song et al.

(10) Patent No.: US 10,970,577 B1
(45) Date of Patent: Apr. 6, 2021

(54) MACHINE LEARNED SINGLE IMAGE ICON IDENTIFICATION

(71) Applicant: Snap Inc., Santa Monica, CA (US)

(72) Inventors: Meng Song, La Jolla, CA (US); Harsh Agrawal, Culver City, CA (US); Xiaoyu Wang, Playa Vista, CA (US); Xuan Huang, Marina del Rey, CA (US); William Brendel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 134 days.

(21) Appl. No.: 16/136,998

(22) Filed: Sep. 20, 2018

Related U.S. Application Data

(60) Provisional application No. 62/566,078, filed on Sep. 29, 2017.

(51) Int. Cl.
| | | |
|---|---|---|
| *G06K 9/32* | (2006.01) | |
| *G06K 9/34* | (2006.01) | |
| *G06K 9/62* | (2006.01) | |
| *G06N 20/00* | (2019.01) | |

(52) U.S. Cl.
CPC ............. *G06K 9/3241* (2013.01); *G06K 9/34* (2013.01); *G06K 9/6201* (2013.01); *G06N 20/00* (2019.01); *G06K 2009/6213* (2013.01)

(58) Field of Classification Search
CPC ........... G06K 9/00288; G06K 9/00671; G06K 9/228; G06K 9/3241; G06Q 30/02
See application file for complete search history.

(56) References Cited

U.S. PATENT DOCUMENTS

| 8,175,413 | B1* | 5/2012 | Ioffe | G06K 9/20 |
| | | | | 382/283 |
| 8,767,012 | B2* | 7/2014 | Gilger | G06F 3/04817 |
| | | | | 345/629 |
| 9,424,461 | B1* | 8/2016 | Yuan | G06K 9/00214 |
| 10,600,060 | B1* | 3/2020 | Schiffman | G06K 9/2054 |
| 2012/0250942 | A1* | 10/2012 | Boncyk | H04N 21/44222 |
| | | | | 382/103 |
| 2013/0031479 | A1* | 1/2013 | Flowers | G06F 3/0482 |
| | | | | 715/716 |
| 2013/0097625 | A1* | 4/2013 | Thorwirth | G06F 16/48 |
| | | | | 725/25 |
| 2014/0101617 | A1* | 4/2014 | Yang | G06K 9/00288 |
| | | | | 715/846 |
| 2014/0118239 | A1* | 5/2014 | Phillips | G06F 3/1454 |
| | | | | 345/156 |

(Continued)

*Primary Examiner* — Dung Hong
(74) *Attorney, Agent, or Firm* — Schwegman Lundberg & Woessner, P.A.

(57) ABSTRACT

Systems, devices, media, and methods are presented for graphical icon identification within an image or video stream. The systems and methods receive an image including a graphical icon. The systems and methods identify a set of proposed regions of the image, at least one proposed region of the set of proposed regions containing the graphical icon and extract a set of semantic features for each proposed region of the set of proposed regions. Based on the set of semantic features of the set of proposed regions, the systems and methods identify a set of proposed icons corresponding to the graphical icon included in the image and determine a match between the graphical icon and at least one proposed icon of the set of proposed icons.

20 Claims, 11 Drawing Sheets

(56) References Cited

U.S. PATENT DOCUMENTS

| | | | |
|---|---|---|---|
| 2014/0214547 A1* | 7/2014 | Signorelli | G06Q 30/0267 705/14.64 |
| 2015/0092061 A1* | 4/2015 | Chao | G06Q 10/06 348/158 |
| 2015/0294191 A1* | 10/2015 | Zhang | G06K 9/6272 382/160 |
| 2018/0204059 A1* | 7/2018 | Antol | G06K 9/00671 |

* cited by examiner

VERIFICATION NETWORK TRAINING

| | TRAIN | TEST |
|---|---|---|
| CLASSES | 266 | 30 |
| IMAGES | 73,764 | 8,038 |
| LOGO PATCHES (1 PER IMAGE) | 73,764 | 8,038 |
| NON-LOGO PATCHES (5 PER IMAGE) | 368,820 | 40,190 |
| PAIRS | 147,528 | 16,076 |
| | POSITIVES: 73764<br>NEGATIVES: 73,764<br>(LOGO: 36918<br>NON-LOGO: 36846) | POSITIVES: 8038<br>NEGATIVES: 8,038<br>(LOGO: 4022<br>NON-LOGO: 4016) |

FIG. 8

MACHINE LEARNED SINGLE IMAGE ICON IDENTIFICATION

RELATED APPLICATIONS

This application claims the priority benefit of U.S. Provisional Application No. 62/566,078 entitled "MACHINE LEARNED SINGLE IMAGE ICON IDENTIFICATION," filed Sep. 29, 2017, which is hereby incorporated herein by reference in its entirety.

TECHNICAL FIELD

Embodiments of the present disclosure relate generally to machine learned object identification within an image. More particularly, but not by way of limitation, the present disclosure addresses systems and methods for machine learned detection and identification of graphical icons within an image.

BACKGROUND

Object detection applications may identify objects within an image. Often systems and methods for object detection or identification are trained using a fixed training set of manually labeled images. When using these systems and methods to detect objects which are new or otherwise dissimilar to objects within the fixed training set, the systems and methods often fail, provide false positive determinations, or otherwise result in erroneous or unsatisfactory object identification results.

BRIEF DESCRIPTION OF THE DRAWINGS

Various ones of the appended drawings merely illustrate example embodiments of the present disclosure and should not be considered as limiting its scope.

FIG. 8 is a representation of verification network training statistics, according to some example embodiments.

Figure 1:
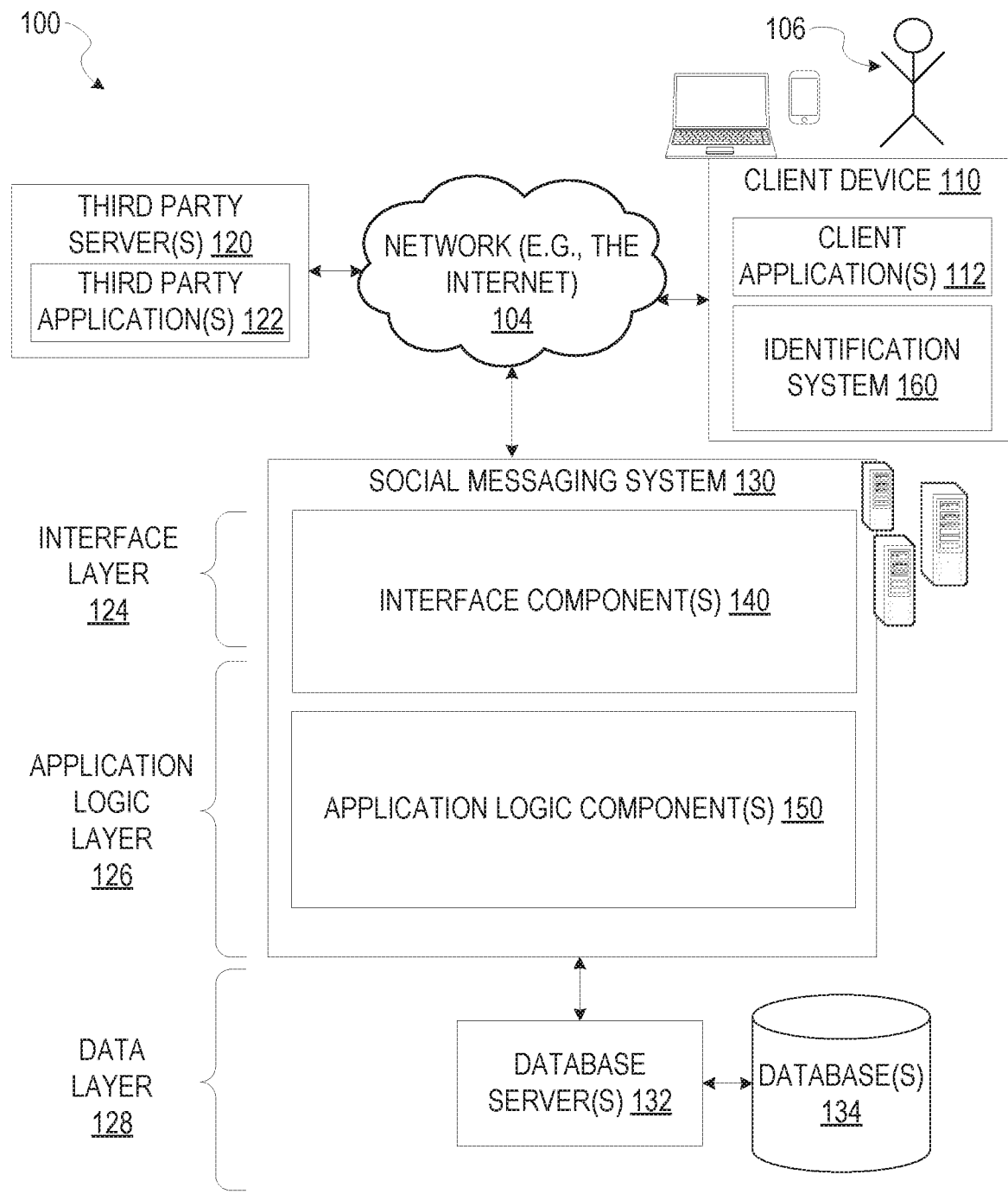
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

One aspect of the present disclosure describes systems and methods for identifying objects of interest within an image or video stream. Objects of interest may be natural or manmade objects. For example, an object of interest within an image may be a graphically depicted object such as an icon or a logo. A list of logos may be provided to a machine learning interface and stored within a database. Given the list of logos, registered with the database, systems and methods of the present disclosure may detect and identify logos which appear in an image or video stream. Aspects of the present disclosure identify icons or logos present within the image or video stream and determine a position of the icon or logo within the image or video stream. Icon or logo detection may provide information, statistics, verification, or feedback on user engagement, user targeting, and measuring effects of icon or logo presentation on a social media platform.

In some embodiments, a user of a social media application may capture images with a company logo. The systems and methods of the present disclosure may use neural networking models to identify a location or position of the icon within the captured images and identify or match the logo to a standard version of the logo. The neural networking models may be trained and configured to receive new logos periodically and perform reliable identification of the new logos without additional training, a manual annotation process, or additional images having variations of the new logo.

Previous or current systems and methods for object detection and identification may employ deep learning and feature matching. Deep learning techniques may be used for generic object detection. For example, previous or current systems and methods may train a deep learning model to identify regions of an image, a set of images, or a video stream that may contain an object of interest. Some of these systems and methods draw bounding boxes around the regions of the image. The bounding boxes may be adjusted and the object of interest or the region containing the object of interest may be labeled as belonging to one or more classes known to the deep learning model. Such systems and methods often train the deep learning models using hundreds of examples for each class, object, icon, or logo to be identified. Relying on hundreds of example images may be infeasible for many objects due to labeling or annotation time, model training time, and related costs. Further, each time a new class, object, or icon is to be added to the model, the deep learning model will be entirely retrained. Obtaining data annotations, such as labeled object images, for a new object, icon, class, or logo may be subject to long tail distribution and may infrequently occur within images.

Previous or current systems and methods employing feature matching may employ algorithms using hand-designed features such as Scale-Invariant Feature Transform (e.g., SIFT). Such systems may extract SIFT descriptors on pairs of images. The pair of images may be matched against one another and a geometric verification may be employed to identify an object, class, icon, or logo. Feature matching systems may not be tuned for certain types of object, class, icon, or logo detection and identification. The lack of tuning may provide low recall and precision for object, class, icon, or logo detection and identification. Further, these feature matching systems and methods may encounter difficulties, failures, and misclassifications where objects have unexpected or untrained poses, illumination, or geometric transformations. Thus such detection methods often fail in object detection and identification for objects in images depicting real world scenarios having a wide variety of backdrops, locations, focal clarity, reflective surfaces, varied textures and substrates, and other variances. For example, objects depicted on a billboard, a reflective surface, a shirt, a shoe, a glass surface, or a plastic surface may be assigned different labels or errors based on differences underlying presentation of a single object or type of object.

Previous or current methods and systems use a few hundred categories or labels. In real world scenarios, an object detection and identification system may encounter thousands of types or categories of objects to be identified. For example, where objects to be detected are icons or logos of businesses, an identification system may encounter thousands of logos for various businesses encountered by a user, and variants of the thousands of logos. Previous and current systems and methods encounter difficulties with deformed objects of interest. For example, where an object to be identified is a company logo, the logo may be printed on billboards, cups, shirts, and any number of varied items. Previous or current methods and systems may present unsuitable results when presented with objects having large geometric, illumination, and pose variations. Such variations may cause objects or logos to appear in any number of locations within an image, thus complicating detection and identification. Further, previous or current systems and methods may encounter long tail distribution of objects. In long tail distribution situations may impose training and classification difficulties for previous systems and methods since some objects or logos may appear less frequently than others.

Embodiments and aspects of the present disclosure address the technical difficulties discussed above as well as others. Some aspects of the present disclosure use machine learned models configured to leverage detection methods and techniques used to identify known objects in conjunction with a single example of a new object in order to accurately classify real world instances of the new object. Embodiments of the present disclosure may train machine learned models a single time (e.g., initially) and periodically incorporate new object representations. Aspects of the present disclosure, may accurately detect the newly added object during production or run-time using the initially trained model.

In some embodiments, the present disclosure describes systems and methods employ a hybrid pipeline approach, using deep learning techniques for a matching based approach to object identification. The deep learning model learns to extract semantic features for portions of images (e.g., patches) at each possible location that may contain an object to be identified. Embodiments of the present disclosure compares the extracted features from the image or video stream with extracted features for known example objects to identify a set of known objects which are similar to the object detected in the image or video stream. The deep learning and feature extraction may be learned for similarity between a target object and a source object. A resulting model may perform accurate object detection and identification even with objects which have not previously been identified.

The deep learning model may transform a classification problem into a search operation. In some embodiments, the deep learning model searches for a closest entity or known object to an object of interest (e.g., an icon or logo) within an image. The deep learning model may then transfer a label of the known object to the object of interest. Once the label is identified, narrowing the search field, the deep leaning model may incorporate a finer grained search approach, such as identification using extracted semantic features.

The above is one specific example. The various embodiments of the present disclosure relate to devices and instructions by one or more processors of a device to detect and identify objects within an image or video stream. An identification system is described that leverages machine learning techniques, such as deep learning and neural networking, to generate object detection and identification models to identify objects within input images, sets of images, or video streams. In some embodiments, the identification system is configured to periodically receive examples of objects for detection and enable detection of such newly introduced object examples without retraining an existing model or training a new model.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of an identification system 160 such that components of the identification system 160 configure the client device 110 to perform a specific set of functions with respect to operations of the identification system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the identification system 160 to detect and identify objects within received or captured images, sets of images, or video streams.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be par of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the identification system 160 capable of identifying objects in images or video streams. Similarly, the client device 110 includes at least a portion of the identification system 160, as described above. In other examples, client device 110 may include the entirety of the identification system 160. In instances where the client device 110 includes a portion of (or all of) the identification system 160, the client device 110 can work alone or in cooperation with the social messaging system 130 to provide the functionality of the identification system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the identification system 160 may identify an object or objects within a video stream or captured image. The device may identify objects as a part of a generation of content for an ephemeral message, generating or presenting augmented reality environments or experiences, generating behavioral analytics, or identifying user engagement metrics within the ephemeral message system, such as the social messaging system 130.

Figure 2:
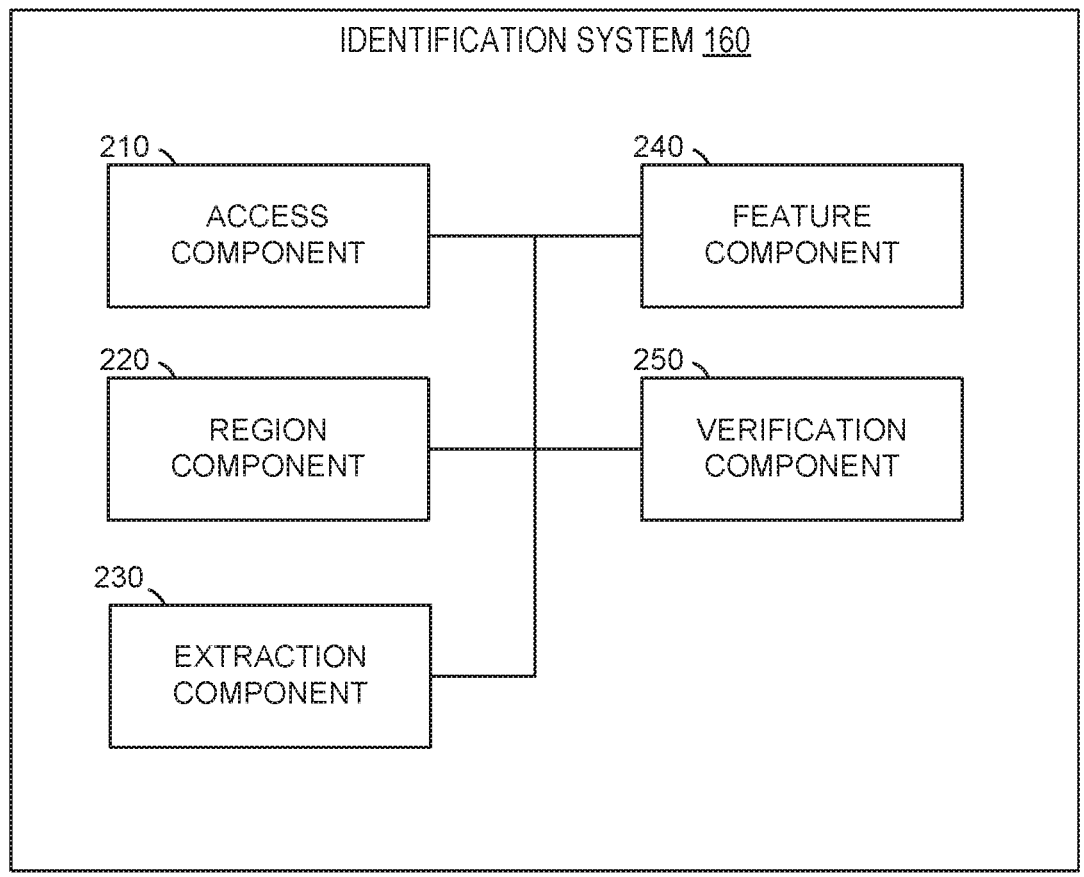
FIG. 2 is a diagram illustrating an identification system, according to some example embodiments.

In FIG. 2, in various embodiments, the identification system 160 can be implemented as a standalone system or implemented in conjunction with the client device 110, and is not necessarily included in the social messaging system 130. The identification system 160 is shown to include an access component 210, a region component 220, an extraction component 230, a feature component 240, and a verification component 250. All, or some, of the components 210-250, communicate with each other, for example, via a network coupling, shared memory, and the like. Each component of components 210-250 can be implemented as a single component, combined into other components, or further subdivided into multiple components. Other components not pertinent to example embodiments can also be included, but are not shown.

Figure 3:
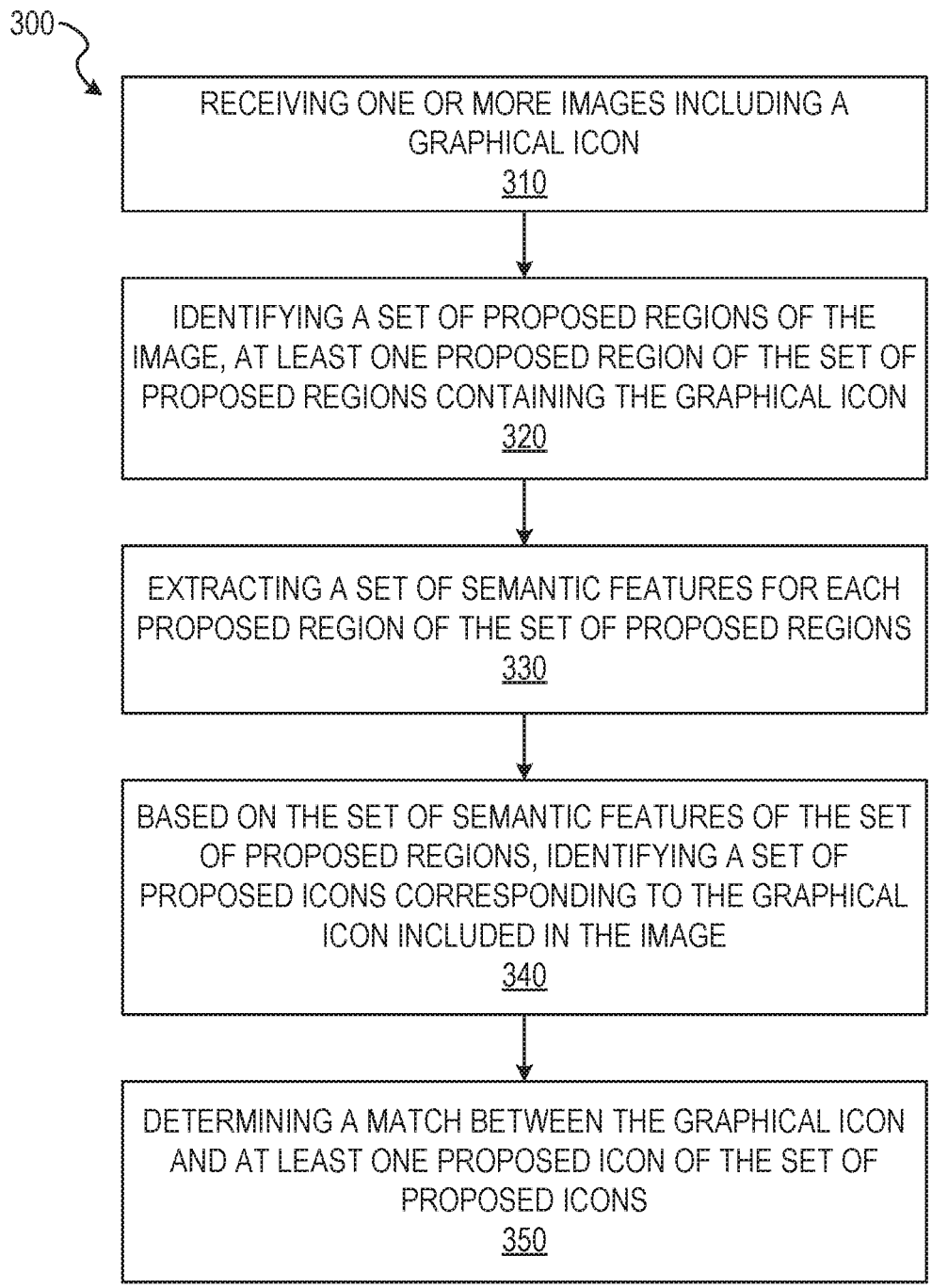
FIG. 3 is a flow diagram illustrating an example method for graphical icon identification, according to some example embodiments.

FIG. 3 depicts a flow diagram illustrating an example method 300 for identifying objects within an image. The operations of method 300 may be performed by components of the identification system 160, and are so described below for purposes of illustration.

Figure 4:
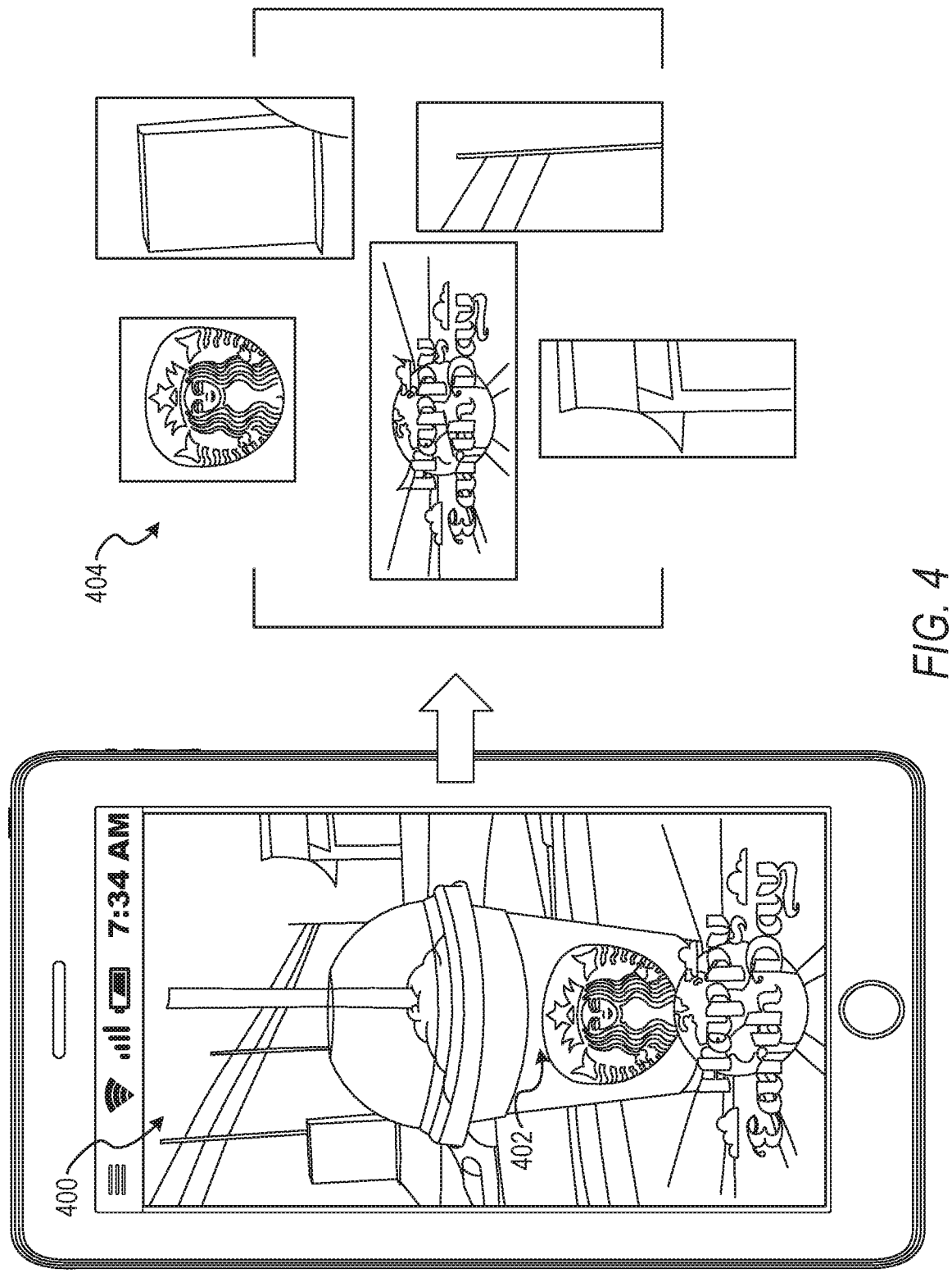
FIG. 4 is a representation of an image and a set of proposed regions within the image, according to some example embodiments.

In operation 310, the access component 210 receives or otherwise accesses one or more images depicting a field of view of an image capture component associated with or coupled to a client device 110. For example, as shown in FIG. 4, the image 400 may be of a coffee cup and may contain additional objects within the field of view as well as overlays or other graphical elements applied to the image. The one or more images (e.g., an image, a set of images, or a video stream) may include an object of interest, such as a graphical icon 402 to be detected and identified.

As shown in FIG. 4, the graphical icon 402 is a coffee company logo. In some embodiments, the access component 210 receives the one or more images as a video stream captured by an image capture device associated with the client device 110 and presented on a user interface of a messaging application, an augmented reality application, a social media application, or any other suitable application and graphical user interface executed on the client device 110. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the ideogram generation system 160, as described below in more detail.

Referring again to FIG. 3, in operation 320, the region component 220 identifies a set of proposed regions of the received image. In some embodiments, at least one proposed region of the set of proposed regions contains the graphical icon (e.g., an object of interest). The region component 220 may incorporate algorithms to identify regions in an image or video that contain graphical icons, objects of interest, or other visual elements. The regions may be small or otherwise tailored to a size of the visual element being identified. In some embodiments, the regions of interest reduce computational cost. Computational cost may be reduced by enabling processing of smaller regions (e.g., regions instead of an entire image) and enabling removal of background clutter from consideration when attempting to identify an object of interest.

As shown in FIG. 4, the region component 220 may identify portions of the image 400. The portions of the image 400 may be identified based on low-level features, such as detected edges, object boundaries, shading changes, color changes, or any other detectable or discernable feature or element depicted within the image. In some embodiments, a deep learning model, generated using one or more neural networking techniques, is incorporated into the region component 220. The deep learning model may be provided training materials and use machine learning techniques to identify features which indicate an object of interest, such as a company logo. The region component 220, using the deep learning model, may select one or more proposed regions 404 from the set of proposed regions having features which indicate the proposed region is likely to contain the graphical icon 402.

In operation 330, the extraction component 230 extracts a set of semantic features for each proposed region of the set of proposed regions. The extraction component 230 may incorporate or be part of a feature embedding network configured to identify and extract features from a proposed region. In some embodiments, the feature embedding network and the extraction component 230 are part of or incorporate portions of the deep learning model. The extracted features may be incorporate the low-level features identified by the region component 220, text, shapes, and any other suitable information. The extracted features may be associated with semantic representations (e.g., semantic features) to enable comparative analysis of the extracted features.

In operation 340, the feature component 240 identifies a set of proposed icons corresponding to the graphical icon included in the image. The set of proposed icons may be a top "k" icons of a plurality of icons which are purported to match the object of interest from the image. The feature component 240 may incorporate or be part of the deep learning model. In some embodiments, the feature component 240 compares semantic features extracted from proposed regions to semantic features for known graphical icons included in a plurality of known icons. The feature component may identify the set of proposed icons from the plurality of known icons using comparison of the semantic features. For example, the feature component 240 may compare semantic representations of features indicating similar visually distinct features. For example, the feature component 240 may compare semantic representations of patches of color, white spaces, shapes, text, and any other visually discernable or distinguishable aspects or attributes to compare the graphical icon and known icons.

In some embodiments, the machine learning techniques train the deep learning model to define criteria for similarity. The feature component 240 may then use the deep learning model to compare semantic features using a nearest neighbor algorithm. The deep learning model may be a multilayer neural networking model. Earlier layers of the deep learning model may identify and compare lower level or low-level features, with each successive layer comparing more abstract features. A final classification layer may perform a classification operation to form a fully connected deep learning model and provide additional classification information by way of additional semantic features. The classification layer may enable a classification process to work as a matching process, inferring an image belongs to a closest class based on the semantic features.

In some embodiments, in identifying the set of proposed icons, the feature component 240 projects the set of semantic features into an n-dimensional metric space. Proposed icons may be mapped to an n-dimensional space. Using the semantic features, the feature component 240 may then impose the semantic features of the graphical icon in the n-dimensional space. The n-dimensional metric space may map a plurality of semantic features to a plurality of icons. Icons with similar features in the n-dimensional metric space may be closer to each other than icons having dissimilar features. For example, a region of a shoe containing a NIKE® icon, when projected into the n-dimensional metric space, will be closer to a NIKE® logo than a STARBUCKS® logo. A deep learning model, comparing icons in the n-dimensional metric space may be discriminatively trained such that the model jointly learns feature representations and semantically meaningful embeddings that are robust to intra-class variations.

The feature component 240 may determine a subset of icons of the plurality of icons within the n-dimensional metric space at a position corresponding to the set of semantic features for the proposed region including the graphical icon. The feature component 240 may then select at least a portion of the subset of icons for inclusion in the set of proposed icons. The feature component 240 may identify numerical representations of matches between the graphical icon and the proposed icon using the n-dimensional metric space. For example, a first icon in a left-hand position of each row may be a graphical icon and each proposed icon in successive positions in the row may be a proposed match to the graphical icon. By way of another example, a first icon in a left-hand position of each row may be a graphical icon and each proposed icon in successive positions in the row may be mismatched icons not selected for inclusion in the set of proposed icons.

In some embodiments, in selecting the portion of the subset of icons for inclusion in the set of proposed icons, the feature component 240 determines a first numerical representation of semantic features corresponding to the graphical icon within the n-dimensional metric space. The feature component 240 may then determine a set of second numerical representations of semantic features of all icons registered with a database and within the n-dimensional metric space. Based on the first numerical representation and the set of second numerical representations, the feature component 240 may identify the portion of the subset of icons for inclusion in the set of proposed icons based on a comparison of the first numerical representation and the set of second numerical representations.

In some instances, the feature component 240 compares the first numerical representation and the set of second representations by identifying a distance threshold for the set of proposed icons. The first numerical representation and the set of second representations may be compared using a nearest neighbor algorithm, a Euclidean distance measure, or any other suitable manner. The distance threshold may represent a maximum difference between the first numerical representation and the set of second numerical representations which indicates a relationship or match between the icon of the first numerical representation and icons of the set of second numerical representations. For example, the distance threshold may indicate a drop off point at which a distance between the first numerical representation and a second numerical representation increases at a rate which is determined to provide an unsuitable proposed icon. The feature component 240 may generate a distance score representing the distance between the first numerical representation and each second numerical representation. The feature component 240 may then select icons of the subset of icons which are associated with a distance below the distance threshold. The selected icons may be included within the set of proposed icons.

In operation 350, the verification component 250 determines a match between the graphical icon and at least one proposed icon of the set of proposed icons. The verification component 250 may receive pairs of icons. The pairs of icons may be presented to the verification component 250 as the graphical icon and one proposed icon of the set of proposed icons. In some embodiments, the top "k" proposed icons (e.g., 5, 10, 15, or 20 proposed icons of the set of proposed icons) may be presented to the verification component 250 in pairwise comparisons with the graphical icon from the image. The pairs of icons may be selected based on similarities of semantic features. As described in more detail below, the verification component 250 may provide a binary comparison indicating a match or no match to identify a most similar pair of icons.

Figure 5:
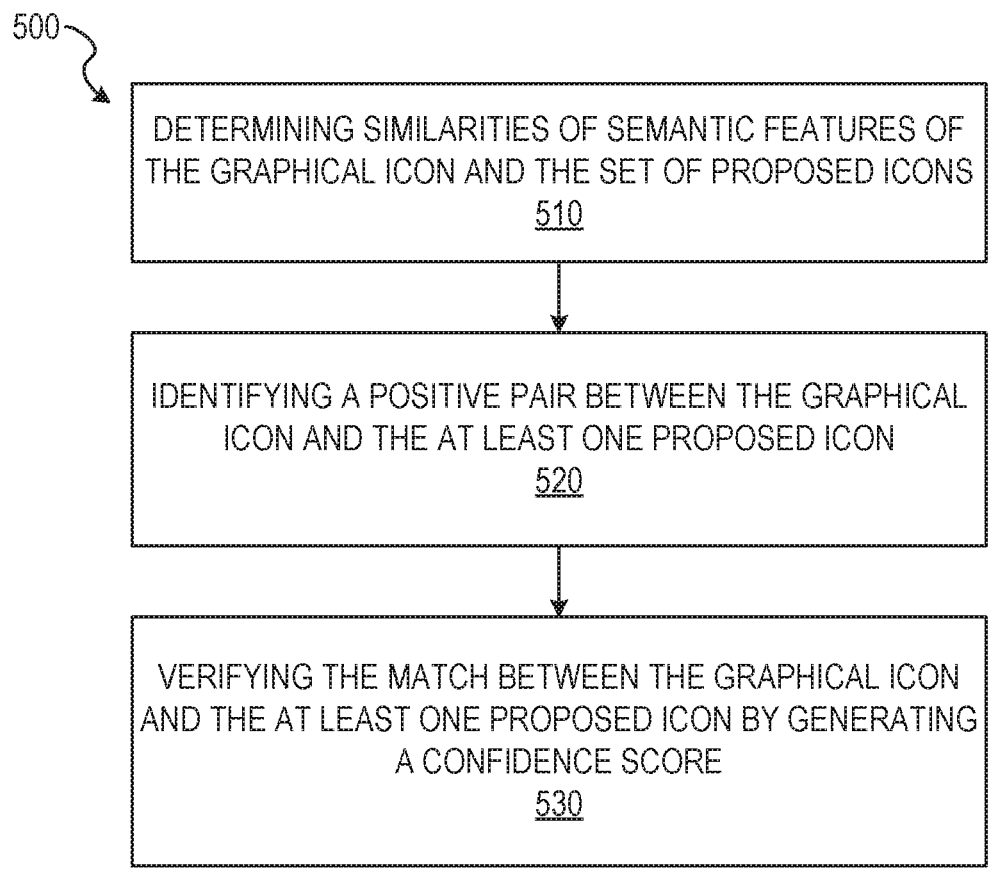
FIG. 5 is a flow diagram illustrating an example method for graphical icon identification, according to some example embodiments.

FIG. 5 depicts a flow diagram illustrating an example method 500 for identifying objects within an image. The operations of method 500 may be performed by components of the identification system 160. In some instances, certain operations of the method 500 may be performed using one or more operations of the method 300 or as sub-operations of one or more operations of the method 300. For example, in some embodiments, the operations of method 500 may be performed during or after operations 310-350 of method 300.

In operation 510, the verification component 250 determines similarities of semantic features of the graphical icon and the set of proposed icons by performing a pairwise comparison of the graphical icon to each proposed icon of the set of proposed icons. The pairwise comparison may be performed in a manner similar to or the same as described above with respect to operations 340 and 350. For example, the pairwise comparison may be performed based on numerical representations of icons, features of icons, semantic features, combinations thereof, or any other suitable representation. In some instances, the verification component 250 performs a pairwise comparison on visually distinct aspects of the graphical icon and each proposed icon of the set of proposed icons. One or more layers of a neural network model may be used to perform pairwise comparisons of individual features of the icons.

In operation 520, the verification component 250 identifies a positive pair between the graphical icon and the at least one proposed icon. The verification component may identify the positive pair based on the similarities of semantic features. As noted above, the verification component 250 may provide a binary comparison indicating a match or no match to identify a most similar pair of icons. Where a pair of icons match, the verification component 250 may classify the pair as a positive pair, meaning that the given graphical icon is a match to the proposed icon in the pair. For example, the verification component 250 may identify matches based on geometric transformations, complementary feature embedding, textual similarities (e.g., type, spacing, font, and content). The pairs of icons determined to be positive pairs may be separated by a distance, numerical or otherwise, less than a specified distance threshold In operation 530, the verification component 250 verifies the match between the graphical icon and the at least one proposed icon by generating a confidence score. The confidence score may be generated based on matches for one or more geometric transformations, complementary feature embedding, and texture similarities among the graphical icon and the at least one proposed icon. In some instances, the verification component 250 generates the confidence score as related to or based on the distance score (e.g., distance threshold).

Figure 6:
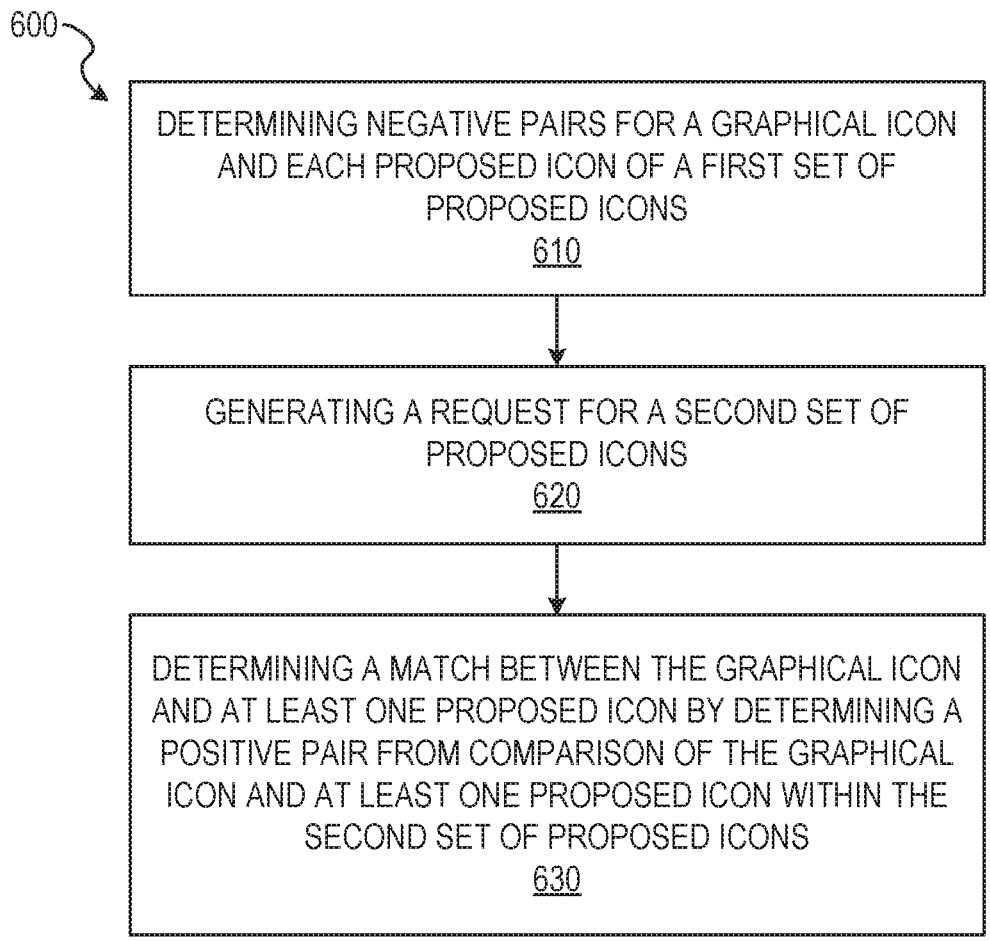
FIG. 6 is a flow diagram illustrating an example method for graphical icon identification, according to some example embodiments.

FIG. 6 depicts a flow diagram illustrating an example method 600 for identifying objects within an image. The operations of method 600 may be performed by components of the identification system 160. In some instances, certain operations of the method 600 may be performed using one or more operations of the method 300 or as sub-operations of one or more operations of the method 300, as will be explained in more detail below. For example, in some embodiments, the operations of method 600 may be performed during or after operations 310-350 of method 300.

In operation 610, the verification component 250 determines negative pairs for a graphical icon and each proposed icon of a first set of proposed icons. As noted above, the verification component 250 may provide a binary comparison indicating a match or no match to identify a most similar pair of icons. Where a pair of icons are not a match, the verification component 250 may classify the pair as a negative pair, indicating that the graphical icon is not representative of the proposed icon. In some embodiments, the verification component 250 determines the negative pairs in a manner similar to or the same as described above with respect to operations 510 and 520. In such instances, the pairs of icons determined to be negative pairs may be separated by a distance, numerical or otherwise, greater than a specified distance threshold. The verification component 250 may identify matches based on geometric transformations, complementary feature embedding, textual similarities (e.g., type, spacing, font, and content).

In operation 620, the verification component 250 generates a request for a second set of proposed icons by expanding the first set of proposed icons from a first number of icons to a second number of icons. As referenced in operation 610, the verification component 250 may determine none of the proposed icons match the graphical icon. In such cases, the verification component 250 may request additional proposed icons. For example, the verification component 250 may access or request presentation of additional proposed icons, expanding the set of proposed icons from the top ten icons to the top twenty icons. In some embodiments, the verification component 250, identifying no matching icons from the set of proposed icons, may generate and cause presentation of a notification indicating no match was found. Regardless of the presentation of the notification, the verification component 250 may pass the request to one or more of the extraction component 230 and the feature component 240. One or more of the extraction component 230 and the feature component 240 may retrieve additional proposed icons for inclusion in the second set of proposed icons. The second set of proposed icons may then be passed to the verification component 250.

In operation 630, the verification component 250 determines the match between the graphical icon and at least one proposed icon by determining a positive pair from comparison of the graphical icon and the at least one proposed icon within the second set of proposed icons. In some embodiments, operation 630 may be performed in a manner similar to or the same as described above with respect to operations 510 and 520. The determination may be performed on the second set of proposed icons. The second set of proposed icons may include or exclude at least a portion of the first set of proposed icons.

Figure 7:
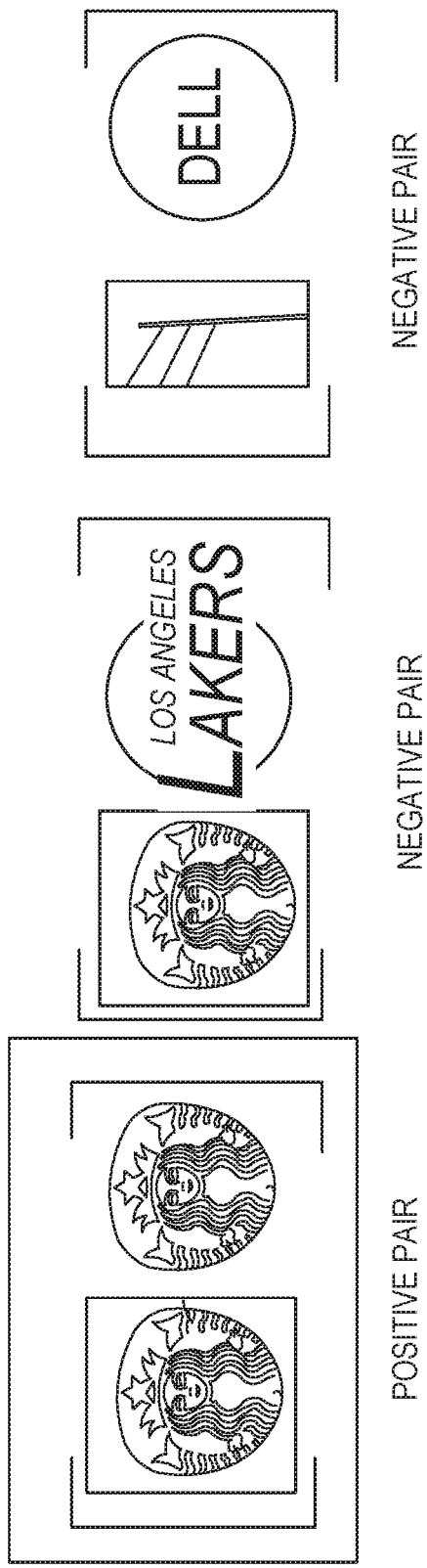
FIG. 7 is a representation of a verification process for pairwise matching of a graphical icon with a proposed icon, according to some example embodiments.
Figure 9:
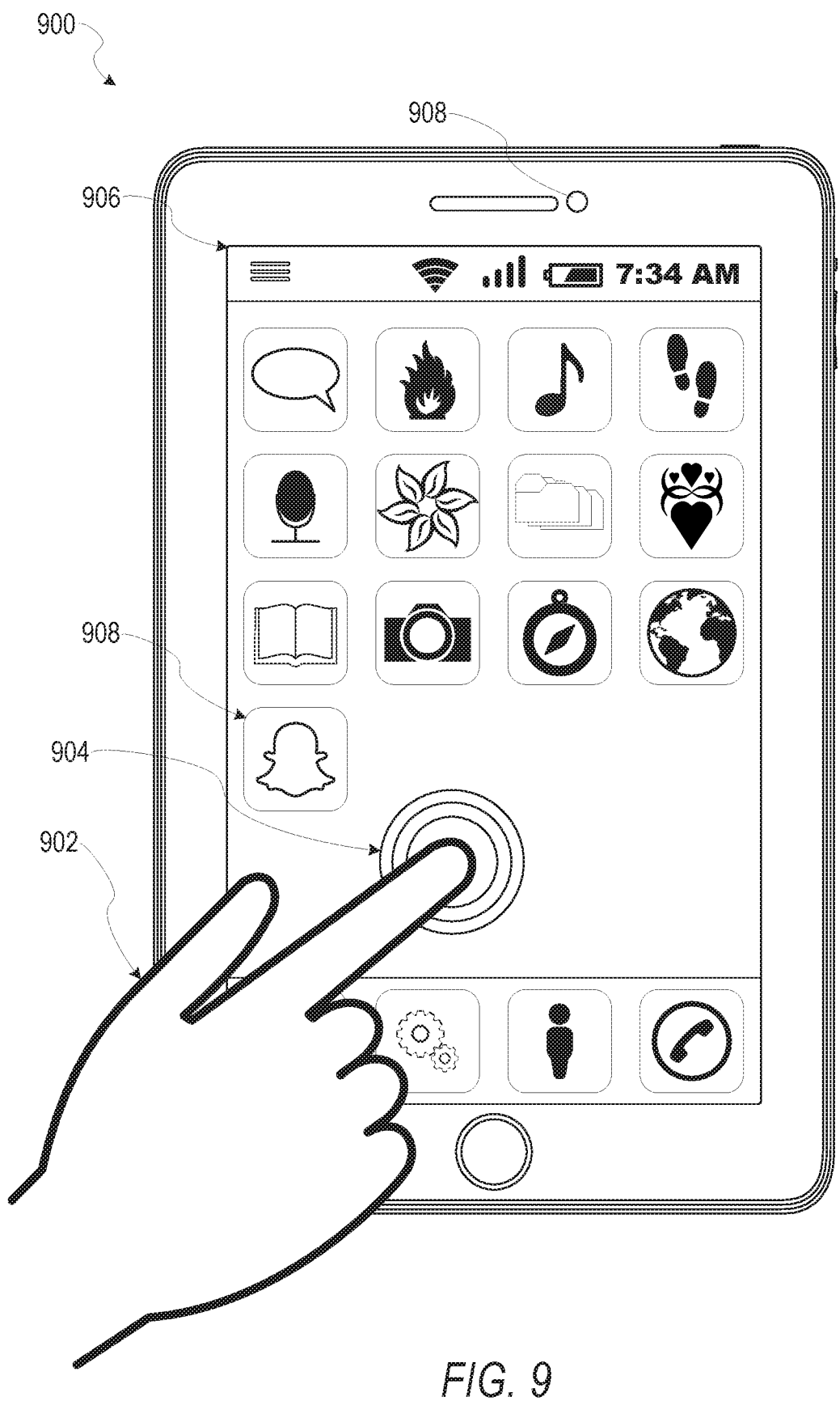
FIG. 9 is a user interface diagram depicting an example mobile device and mobile operating system interface, according to some example embodiments.
Figure 10:
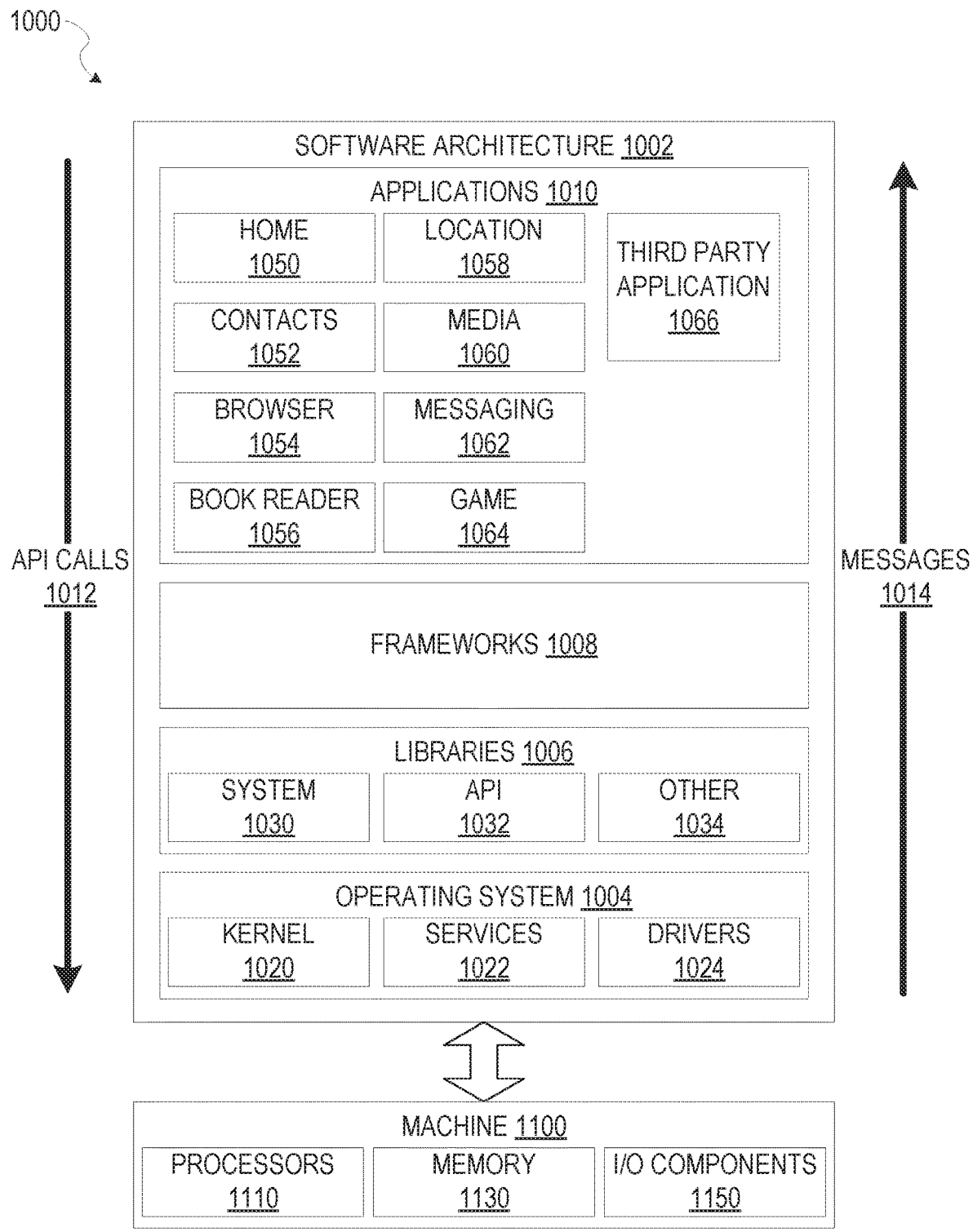
FIG. 10 is a block diagram illustrating an example of a software architecture that may be installed on a machine, according to some example embodiments.
Figure 11:
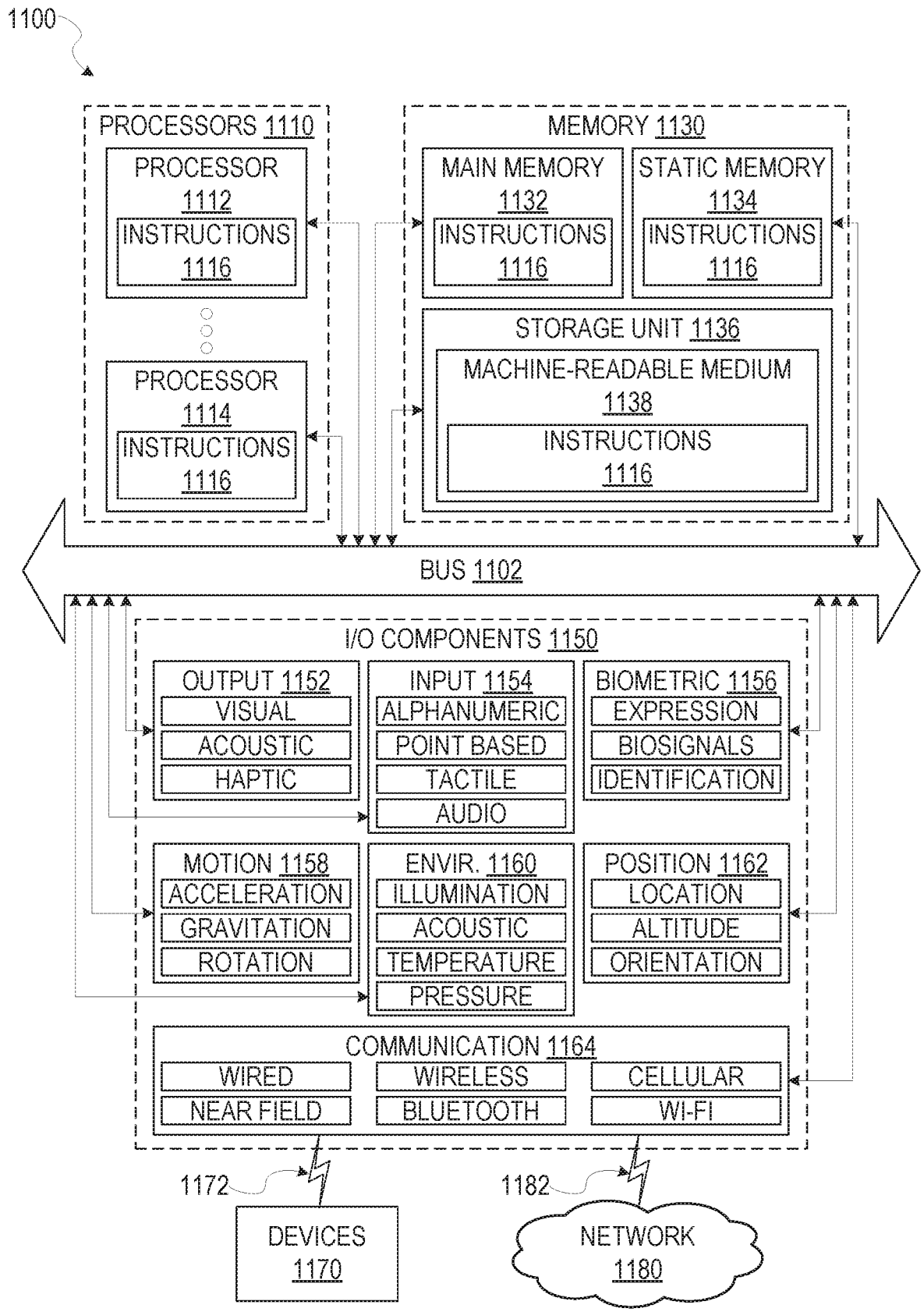
FIG. 11 is a block diagram presenting a diagrammatic representation of a machine in the form of a computer system within which a set of instructions may be executed for causing the machine to perform any of the methodologies discussed herein, according to an example embodiment.

To develop a deep learning model for use in the verification component 250 and for verification of icons or objects of interest from a single initial image, a neural network may be learned that can discriminate between a class-identity of image pairs. For example, FIGS. 7 and 8 show representations of verification component 250 or deep learning model training sets and architectures. A training set for the deep learning model may include a number of logo or icon classes for logos or icons registered with the database, a number of annotated images, and diverse and complex backgrounds. Models that properly perform the verification task may be applicable to a single image icon detection process of the identification system 160. Where features learned by the deep learning model are sufficient to confirm or deny an identity of a graphical icon from a plurality of known icons, the features are often sufficient to confirm or deny the identity of an icon from other newly added single image icons. Such a deep learning model may operate on a pair by pair basis at test time to provide positive and negative classifications of pairs. In some embodiments, the verification component 250 incorporates transformations using deformable convolutional layers to make the verification component 250 more robust to geometric, illumination, and pose variations of graphical icons. Further, the training data set of the verification component 250 may include affine transformations to proposed regions.

In some embodiments, the identification system 160 may be used to measure brand presence in social media postings. The identification system 160 may be used to measure brand, icon, or logo engagement of users, networks of users, or demographic segments. The identification system 160 may be used to identify popular products, favored products of specified users, and other suitable targeting. In some embodiments, the identification system 160 may be used to measure logo, icon, or advertisement performance.

The identification system 160 may also be used in augmented reality presentations. In some embodiments, the identification system 160 may be used to identify logos or triggering objects to present augmented reality elements within a visual display, an image, or a video stream as the video stream is being captured. The identification system 160 may also incorporate sound elements, location, position, visual content, and other information to identify appropriate augmented reality experiences or presentations, tailor experiences of users, or provide additional metrics or visual presentations of brands, icons, or logos.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

FIG. 21 illustrates an example mobile device 1100 executing a mobile operating system (e.g., IOS™, ANDROID™, WINDOWS® Phone, or other mobile operating systems), consistent with some embodiments. In one embodiment, the mobile device 1100 includes a touch screen operable to receive tactile data from a user 1102. For instance, the user 1102 may physically touch 1104 the mobile device 1100, and in response to the touch 1104, the mobile device 1100 may determine tactile data such as touch location, touch force, or gesture motion. In various example embodiments, the mobile device 1100 displays a home screen 1106 (e.g., Springboard on IOS™) operable to launch applications or otherwise manage various aspects of the mobile device 1100. In some example embodiments, the home screen 1106 provides status information such as battery life, connectivity, or other hardware statuses. The user 1102 can activate user interface elements by touching an area occupied by a respective user interface element. In this manner, the user 1102 interacts with the applications of the mobile device 1100. For example, touching the area occupied by a particular icon included in the home screen 1106 causes launching of an application corresponding to the particular icon.

The mobile device 1100, as shown in FIG. 21, includes an imaging device 1108. The imaging device 1108 may be a camera or any other device coupled to the mobile device 1100 capable of capturing a video stream or one or more successive images. The imaging device 1108 may be triggered by the identification system 160 or a selectable user interface element to initiate capture of a video stream or succession of images and pass the video stream or succession of images to the identification system 160 for processing according to the one or more methods described in the present disclosure.

Many varieties of applications (also referred to as "apps") can be executing on the mobile device 1100, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1100 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1100 includes a social messaging app 1110 consistent with some embodiments, allows users to exchange ephemeral messages that include media content. In this example, the social messaging app 1110 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the identification system 160 may detect and identify objects of interest in images within the ephemeral message, perform operations relating to the object of interest, and transmit the ephemeral message to another device using the ephemeral message system.

Software Architecture

FIG. 22 is a block diagram 1200 illustrating an architecture of software 1202, which can be installed on the devices described above. FIG. 22 is merely a non-limiting example of a software architecture, and it will be appreciated that many other architectures can be implemented to facilitate the functionality described herein. In various embodiments, the software 1202 is implemented by hardware such as machine a 1300 of FIG. 23 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages can be employed to create the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third-party application 1266 can invoke the API calls 1212 provided by the operating system 1204 to facilitate functionality described herein.

Example Machine Architecture and Machine-Readable Medium

FIG. 23 is a block diagram illustrating components of a machine 1300, according to some embodiments, able to read instructions (e.g., processor executable instructions) from a machine-readable medium (e.g., a non-transitory machine-readable storage medium) and perform any of the methodologies discussed herein. Specifically. FIG. 23 shows a diagrammatic representation of the machine 1300 in the example form of a computer system, within which instructions 1316 (e.g., software, a program, an application, an applet, an app, or other executable code) for causing the machine 1300 to perform any of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1312 and a processor 1314 that may execute the instructions 1316. The term "processor" is intended to include multi-core processors that may comprise two or more independent processors (also referred to as "cores") that can execute instructions 1316 contemporaneously. Although FIG. 23 shows multiple processors 1310, the machine 1300 may include a single processor with a single core, a single processor with multiple cores (e.g., a multi-core processor), multiple processors with a single core, multiple processors with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by processors of the machine 1300 (e.g., processors 1310), cause the machine 1300 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 23. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components. BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by one or more processors, an image including a graphical icon;
identifying, by the one or more processors, a set of proposed regions of the image, at least one proposed region of the set of proposed regions containing the graphical icon;
extracting a set of semantic features for each proposed region of the set of proposed regions;
based on the set of semantic features of the set of proposed regions, identifying, by the one or more processors, a set of proposed icons corresponding to the graphical icon included in the image; and
determining a match between the graphical icon and at least one proposed icon of the set of proposed icons, the determining of the match comprising performing a pairwise comparison of visually distinct aspects of the graphical icon, included in the image, and each proposed icon of the set of proposed icons that are identified based on the set of semantic features.

2. The method of claim 1, wherein identifying the set of proposed icons further comprises:
projecting the set of semantic features into an n-dimensional metric space mapping a plurality of semantic features to a plurality of icons;
determining a subset of icons, of the plurality of icons, within the n-dimensional metric space at a position corresponding to the set of semantic features proposed region including the graphical icon; and
selecting at least a portion of the subset of icons for inclusion in the set of proposed icons.

3. The method of claim 2, wherein selecting the portion of the subset of icons for inclusion in the set of proposed icons further comprises:
determining a first numerical representation of semantic features corresponding to the graphical icon within the n-dimensional metric space;
determining a set of second numerical representations of semantic features of the subset of icons within the n-dimensional metric space; and
identifying the portion of the subset of icons for inclusion in the set of proposed icons based on a comparison of the first numerical representation and the set of second numerical representations.

4. The method of claim 3, wherein comparing the first numerical representation and the set of second numerical representations further comprises:
identifying a distance threshold for the set of proposed icons, the distance threshold representing a maximum difference between the first numerical representation and the set of second numerical representations; and
selecting icons of the subset of icons associated with a distance below the distance threshold, the selected icons being included in the set of proposed icons.

5. The method of claim 1, wherein determining the match between the graphical icon and the at least one proposed icon further comprises:
verifying the match between the graphical icon and the at least one proposed icon by generating a confidence score based on matches for one or more of geometric transformations, complementary feature embedding, and textual similarities among the graphical icon and the at least one proposed icon.

6. The method of claim 1, wherein determining the match between the graphical icon and the at least one proposed icon further comprises:
determining similarities of semantic features of the graphical icon and the set of proposed icons; and
based on the similarities of semantic features, identifying a positive pair between the graphical icon and the at least one proposed icon.

7. The method of claim 1, wherein the set of proposed icons is a first set of proposed icons, the method further comprising:
determining negative pairs for the graphical icon and each proposed icon of the first set of proposed icons;
generating a request for a second set of proposed icons by expanding the first set of proposed icons from a first number of icons to a second number of icons; and
determining the match between the graphical icon and the at least one proposed icon by determining a positive pair from comparison of the graphical icon and the at least one proposed icon within the second set of proposed icons.

8. A system comprising:
one or more processors; and
a non-transitory processor-readable storage medium storing processor executable instructions that, when executed by the one or more processors, cause the one or more processors to perform operations comprising:
receiving an image including a graphical icon;
identifying a set of proposed regions of the image, at least one proposed region of the set of proposed regions containing the graphical icon;
extracting a set of semantic features for each proposed region of the set of proposed regions;
based on the set of semantic features of the set of proposed regions, identifying a set of proposed icons corresponding to the graphical icon included in the image; and
determining a match between the graphical icon and at least one proposed icon of the set of proposed icons, the determining of the match comprising performing a pairwise comparison of visually distinct aspects of the graphical icon, included in the image, and each proposed icon of the set of proposed icons that are identified based on the set of semantic features.

9. The system of claim 8, wherein identifying the set of proposed icons further comprises:
projecting the set of semantic features into an n-dimensional metric space mapping a plurality of semantic features to a plurality of icons;
determining a subset of icons, of the plurality of icons, within the n-dimensional metric space at a position corresponding to the set of semantic features proposed region including the graphical icon; and
selecting at least a portion of the subset of icons for inclusion in the set of proposed icons.

10. The system of claim 9, wherein selecting the portion of the subset of icons for inclusion in the set of proposed icons further comprises:

determining a first numerical representation of semantic features corresponding to the graphical icon within the n-dimensional metric space;

determining a set of second numerical representations of semantic features of the subset of icons within the n-dimensional metric space; and identifying the portion of the subset of icons for inclusion in the set of proposed icons based on a comparison of the first numerical representation and the set of second numerical representations.

11. The system of claim 10, wherein comparing the first numerical representation and the set of second numerical representations further comprises:

identifying a distance threshold for the set of proposed icons, the distance threshold representing a maximum difference between the first numerical representation and the set of second numerical representations; and selecting icons of the subset of icons associated with a distance below the distance threshold, the selected icons being included in the set of proposed icons.

12. The system of claim 8, wherein determining the match between the graphical icon and the at least one proposed icon further comprises:

verifying the match between the graphical icon and the at least one proposed icon by generating a confidence score based on matches for one or more of geometric transformations, complementary feature embedding, and textual similarities among the graphical icon and the at least one proposed icon.

13. The system of claim 8, wherein determining the match between the graphical icon and the at least one proposed icon further comprises:

determining similarities of semantic features of the graphical icon and the set of proposed icons; and based on the similarities of semantic features, identifying a positive pair between the graphical icon and the at least one proposed icon.

14. The system of claim 8, wherein the set of proposed icons is a first set of proposed icons, the operations further comprising:

determining negative pairs for the graphical icon and each proposed icon of the first set of proposed icons;

generating a request for a second set of proposed icons by expanding the first set of proposed icons from a first number of icons to a second number of icons; and determining the match between the graphical icon and the at least one proposed icon by determining a positive pair from comparison of the graphical icon and the at least one proposed icon within the second set of proposed icons.

15. A non-transitory processor-readable storage medium storing processor executable instructions that, when executed by a processor of a machine, cause the machine to perform operations comprising:

receiving an image including a graphical icon;

identifying a set of proposed regions of the image, at least one proposed region of the set of proposed regions containing the graphical icon;

extracting a set of semantic features for each proposed region of the set of proposed regions;

based on the set of semantic features of the set of proposed regions, identifying a set of proposed icons corresponding to the graphical icon included in the image; and determining a match between the graphical icon and at least one proposed icon of the set of proposed icons, the determining of the match comprising performing a pairwise comparison of visually distinct aspects of the graphical icon, included in the image, and each proposed icon of the set of proposed icons that are identified based on the set of semantic features.

16. The non-transitory processor-readable storage medium of claim 15, wherein identifying the set of proposed icons further comprises:

projecting the set of semantic features into an n-dimensional metric space mapping a plurality of semantic features to a plurality of icons;

determining a subset of icons, of the plurality of icons, within the n-dimensional metric space at a position corresponding to the set of semantic features proposed region including the graphical icon; and selecting at least a portion of the subset of icons for inclusion in the set of proposed icons.

17. The non-transitory processor-readable storage medium of claim 16, wherein selecting the portion of the subset of icons for inclusion in the set of proposed icons further comprises:

determining a first numerical representation of semantic features corresponding to the graphical icon within the n-dimensional metric space;

determining a set of second numerical representations of semantic features of the subset of icons within the n-dimensional metric space; and identifying the portion of the subset of icons for inclusion in the set of proposed icons based on a comparison of the first numerical representation and the set of second numerical representations.

18. The non-transitory processor-readable storage medium of claim 17, wherein comparing the first numerical representation and the set of second numerical representations further comprises:

identifying a distance threshold for the set of proposed icons, the distance threshold representing a maximum difference between the first numerical representation and the set of second numerical representations; and selecting icons of the subset of icons associated with a distance below the distance threshold, the selected icons being included in the set of proposed icons.

19. The non-transitory processor-readable storage medium of claim 15, wherein determining the match between the graphical icon and the at least one proposed icon further comprises:

verifying the match between the graphical icon and the at least one proposed icon by generating a confidence score based on matches for one or more of geometric transformations, complementary feature embedding, and textual similarities among the graphical icon and the at least one proposed icon.

20. The non-transitory processor-readable storage medium of claim 15, wherein determining the match between the graphical icon and the at least one proposed icon further comprises:

determining similarities of semantic features of the graphical icon and the set of proposed icons; and based on the similarities of semantic features, identifying a positive pair between the graphical icon and the at least one proposed icon.

* * * * *